(12) United States Patent
Wang et al.

(10) Patent No.: US 9,047,376 B2
(45) Date of Patent: Jun. 2, 2015

(54) AUGMENTING VIDEO WITH FACIAL RECOGNITION

(75) Inventors: Zhibing Wang, Beijing (CN); Dong Wang, Beijing (CN); Betina J. Chan-Martin, Encino, CA (US); Yupeng Liao, Los Angeles, CA (US); Tao Xiong, Beijing (CN); Cailiang Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 446 days.

(21) Appl. No.: 13/461,510

(22) Filed: May 1, 2012

(65) Prior Publication Data

US 2013/0294642 A1 Nov. 7, 2013

(51) Int. Cl.
*G06K 9/00* (2006.01)
*G06F 17/30* (2006.01)
*G06K 9/46* (2006.01)

(52) U.S. Cl.
CPC ...... *G06F 17/30855* (2013.01); *G06K 9/00261* (2013.01); *G06K 9/00281* (2013.01); *G06K 9/00744* (2013.01); *G06K 9/469* (2013.01)

(58) Field of Classification Search
None
See application file for complete search history.

(56) References Cited

U.S. PATENT DOCUMENTS

| 2008/0013837 | A1* | 1/2008 | Porter et al. | 382/218 |
| 2008/0285791 | A1* | 11/2008 | Suzuki et al. | 382/100 |
| 2011/0038512 | A1* | 2/2011 | Petrou et al. | 382/118 |

* cited by examiner

*Primary Examiner* — Atiba O Fitzpatrick
(74) *Attorney, Agent, or Firm* — Fountainhead Law Group PC

(57) ABSTRACT

A video segment including interactive links to information about an actor appearing in the segment may be prepared in an automatic or semi-automatic process. A computer may detect an actor's face appearing in a frame of digital video data by processing the video file with a facial detection algorithm. A user-selectable link may be generated and activated along a track of the face through multiple frames of the video data. The user-selectable link may include a data address for obtaining additional information about an actor identified with the face. The video data may be associated with the user-selectable link and stored in a computer memory. When later viewing the video segment via a media player, a user may select the link to obtain further information about the actor.

33 Claims, 12 Drawing Sheets

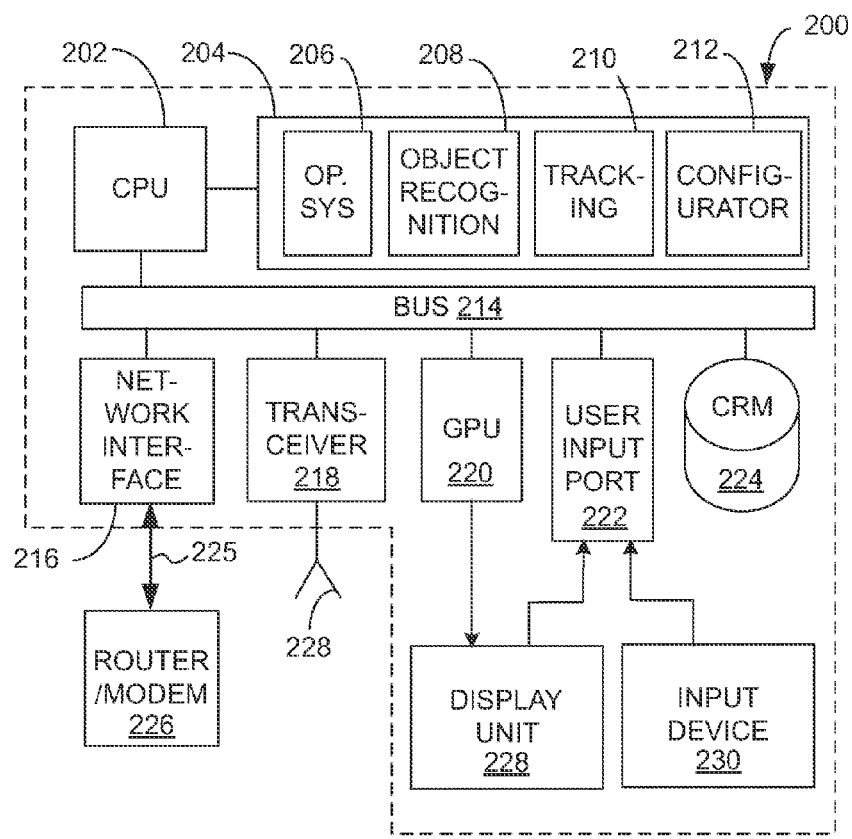
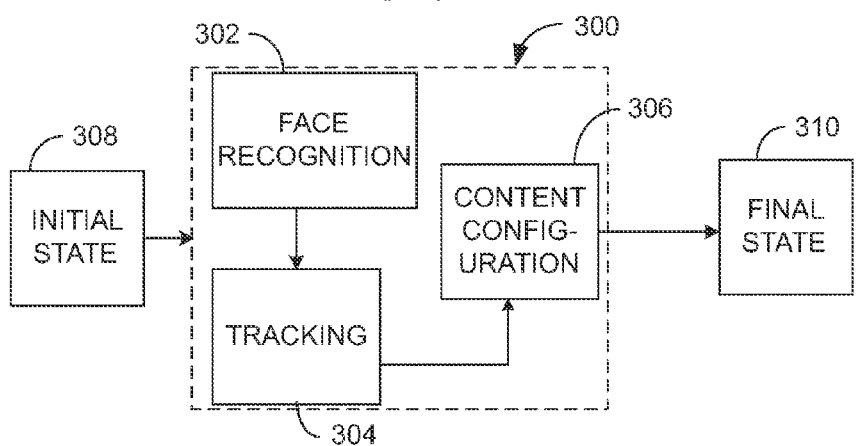

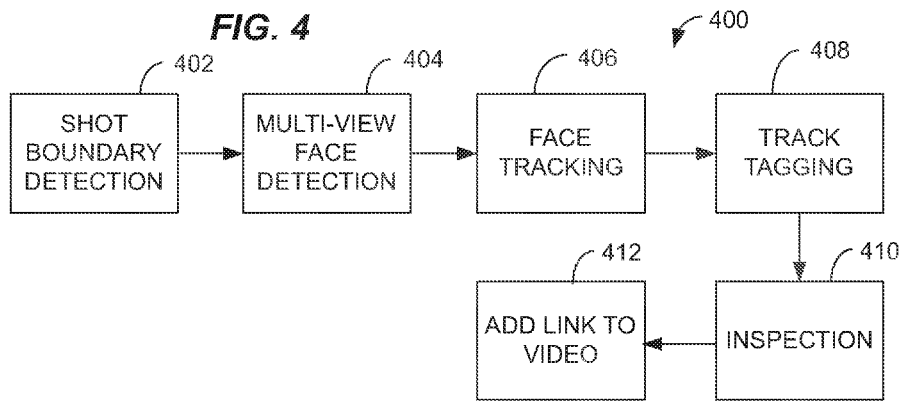
FIG. 4
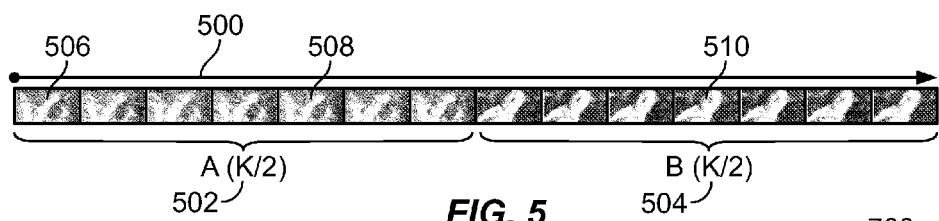
FIG. 5
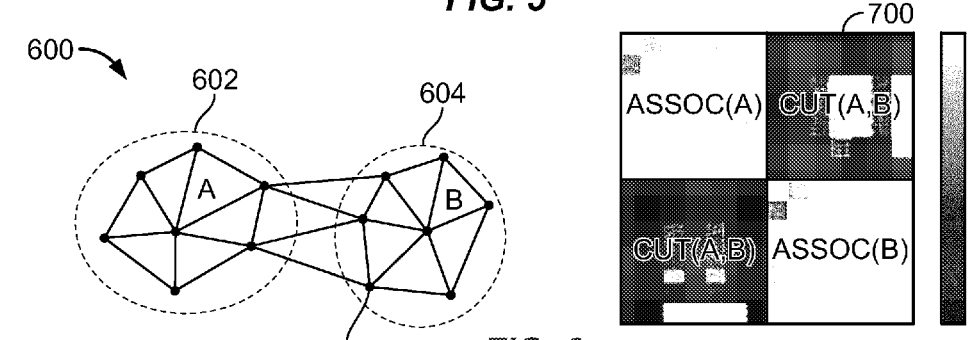
FIG. 6
FIG. 7
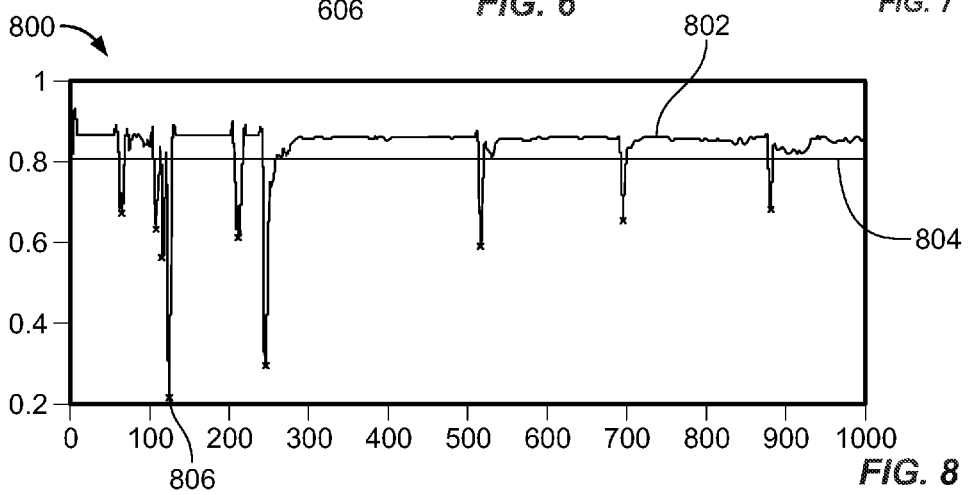
FIG. 8

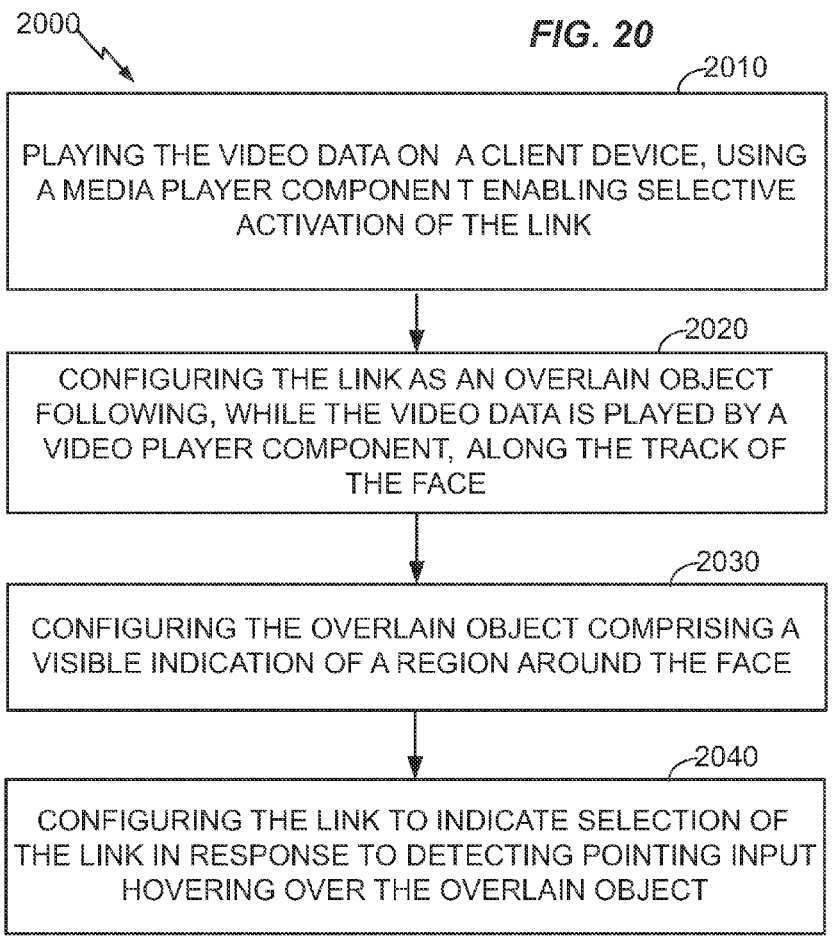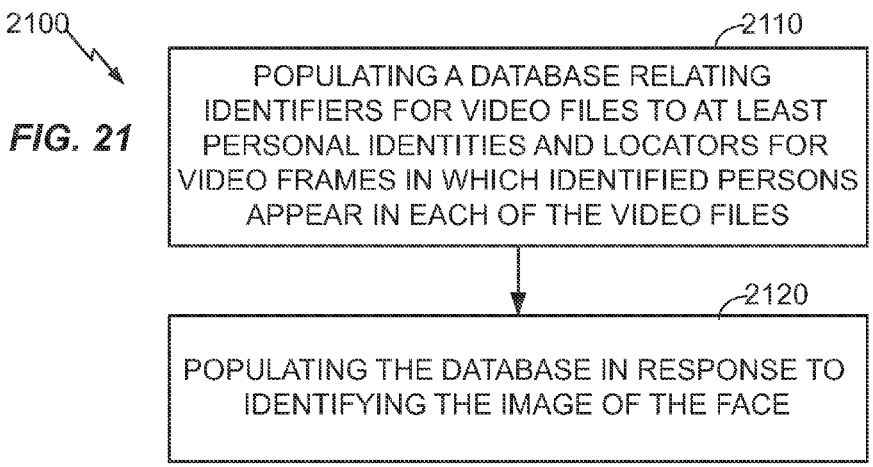

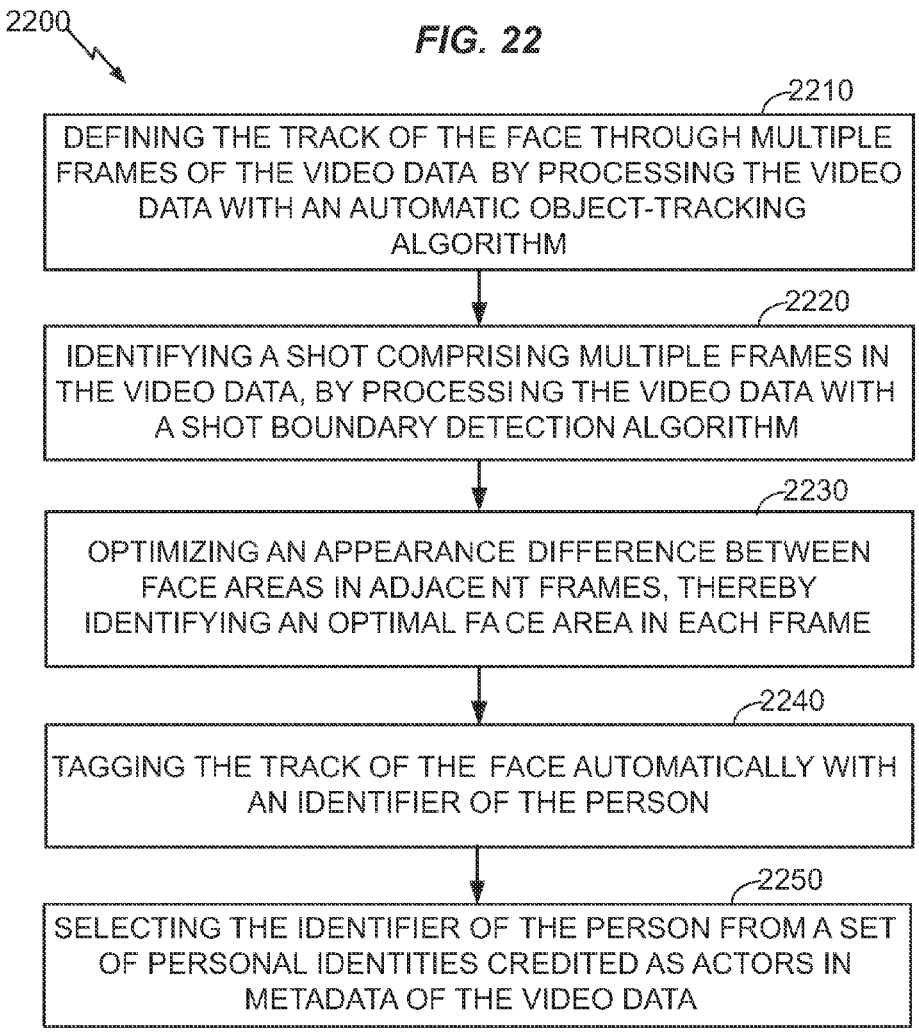

AUGMENTING VIDEO WITH FACIAL RECOGNITION

FIELD

The present application relates generally to input/output processing using a computer, and more particularly to augmenting video with facial recognition features, including preparing augmented video and playing augmented video using a media device to provide interactive facial recognition features.

BACKGROUND

Electronic video data often includes interactive features related to images appearing in video output. For example, Adobe™ Flash™, Blu-ray™, and other media player applications support layered video, overlays, and similar features that can be included with video data. Using such features, video data may incorporate objects within the picture frame itself that are responsive to user input to link to further information. For example, video data may be configured with areas or objects that a user may select using input from a touchscreen, pointing device, or the like. In response to detecting user selection input directed to a preconfigured object appearing in a video, a computer may take some predetermined action based on the identity of the selected object. For example, the computer may obtain and display some additional information about the interactive object in a separate window or display area.

Embedded interactivity, however, has not become commonplace even in environments that readily support user interactivity, for example, personal computers, notepad computers, smartphones, and so forth. Prior methods for preparing interactive content embedded in video content may require a significant amount of manual configuration and planning. Such requirements may discourage the creation of interactive content and limit its distribution. In addition, much video content is still primarily viewed on non-interactive platforms such as televisions, which may further reduce the incentives for producing interactive video content.

These and other limitations of prior methods for providing interactive video content may be overcome by the novel methods and apparatus disclosed herein.

SUMMARY

Methods, apparatus and systems for augmenting video with facial recognition features are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A computer configured as a video processing apparatus may perform a method for augmenting video with facial recognition features. The method may include detecting a face appearing in a frame of digital video data by processing the video file with a facial detection algorithm executing in one or more computers. As used herein, a "face" when used in the context of video data refers to an image or digital representation of a face belonging to a person or character; or if used in the context of a physical attribute in the real world, a physical face belonging to a person or character. The method may further include configuring at least one user-selectable link to be activated along a track of the face through multiple frames of the video data, wherein the user-selectable link comprises a data address for obtaining additional information about a person identified with the face, and storing the video data associated with the user-selectable link in a computer memory.

The method may include one or more additional aspects or operations in addition to those summarized above. For example, the method may further include storing the additional information about the person in a memory location addressed by the data address. In a more detailed aspect, the method may include configuring the additional information comprising biographical information about the person. The method may further include comprising serving the video data associated with the link to a client device. For example, a computer server may serve the additional information about the person to the client device, in response to selection of the link at the client device. A client device (e.g., personal computer, notepad computer, smartphones, smart television, etc.) may play the video data on a client device, using a media player component enabling selective activation of the link.

In an aspect, the method may include configuring the link as an overlain object following, while the video data is played by a video player component, along the track of the face. For example, the method may include configuring the overlain object comprising a visible indication of a region around the face. In the alternative, or in addition, the method may include configuring the link to indicate selection of the link in response to detecting pointing input hovering over the overlain object.

In an aspect, the computer memory holding video data may hold the video data associated with the user-selectable link together in one or more stored files. The data address may comprise a network location for a record holding the additional information. The method may include populating a database relating identifiers for video files to at least personal identities and locators for video frames in which identified persons appear in each of the video files.

In other aspects, the method may include defining the track of the face through multiple frames of the video data by processing the video data with an automatic object-tracking algorithm. The method may include identifying a shot comprising multiple frames in the video data, by processing the video data with a shot boundary detection algorithm. The automatic object-tracking algorithm may include optical flow optimizing an appearance difference between face areas in adjacent frames, thereby identifying an optimal face area in each frame. The method may include recognizing the face using a facial recognition algorithm to obtain an identifier of the person, and tagging the track of the face with the identifier of the person. The method may include selecting the identifier of the person from a set of personal identities credited as actors in metadata of the video data.

In related aspects, a client-side or server-side computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, network-enabled televisions, set-top boxes, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for augmenting video with facial recognition features are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIG. 2 is a schematic block diagram illustrating an embodiment of a computer for supporting and executing the systems and methods described herein.

FIG. 3 is a state diagram illustrating general aspects of a process for providing interactive video content based on facial detection, tracking and recognition in a video segment.

FIG. 4 is a flow diagram illustrating elements of a method for providing interactive video content based on facial detection, tracking and recognition in a video segment.

FIG. 5 is a diagram illustrating aspects of frame sets and shot boundary detection.

FIG. 6 is a graph illustrating differences between frame sets that may be used for shot boundary detection.

FIG. 7 is a diagram illustrating a matrix that may be used for shot boundary detection.

FIG. 8 is a chart illustrating a curve that may be used for shot boundary detection.

FIGS. 17-22 are diagrams illustrating operations that may be performed by a video processing apparatus for configuring video content with interactive features based on facial detection, tracking and recognition.

DETAILED DESCRIPTION

Figure 1:
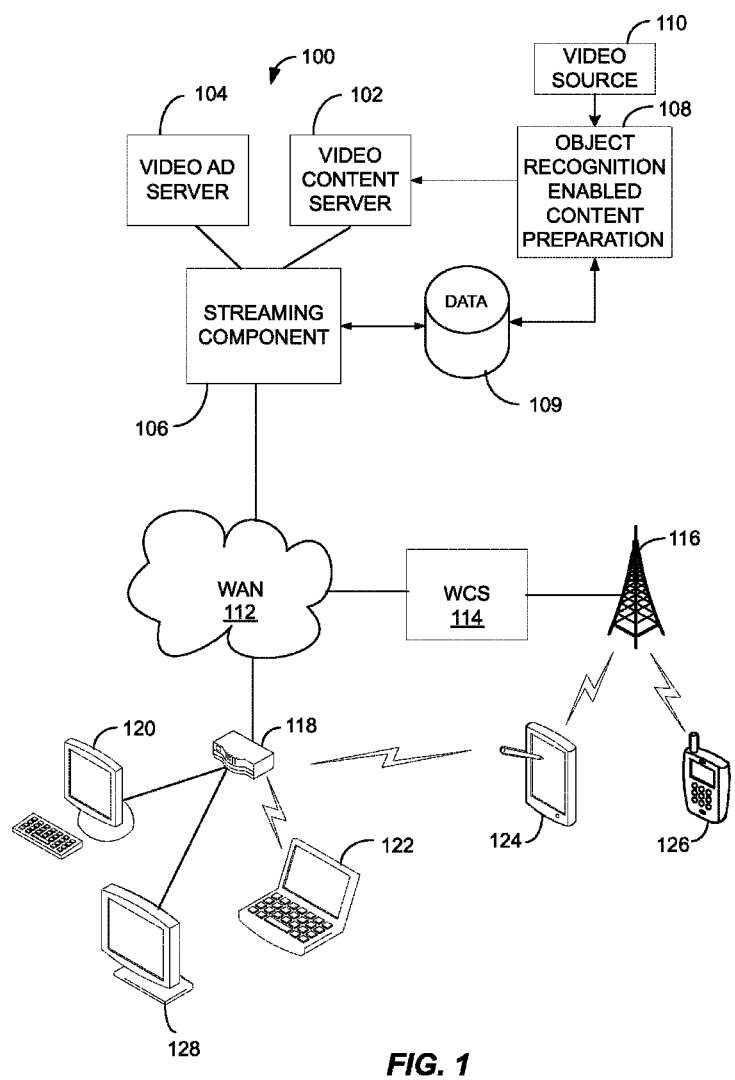
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented in conjunction with a video streaming system 100 in communication with multiple client devices via one or more communication networks. Aspects of the video streaming system 100 are described merely to provide an example of an application for enabling distribution of content prepared according to the present disclosure. It should be appreciated that the present technology is not limited to streaming video applications, and may be adapted for other applications.

Video data without interactive features may be obtained from one or more sources for example, from a video source 110, for use as input to a process for enabling interactivity for one or more objects appearing in the video. The one or more objects may include, for example, a human face. The input video data may comprise raw or edited frame-based video data in any suitable digital format, for example, MPEG-1, MPEG-2, MPEG-4, VC-1, or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers.

The input video data may be provided to a computing module 108 for preparation of video content that is object-recognition enabled. The module 108 may be implemented by a computer, for example, one or more computers configured with image processing applications and hardware as described herein. The module 108 is configured to receive video data, and process the video data using one or more automatic or semi-automatic processes as described herein to add interactivity based on objects appearing in the frame-based images making up the video data.

Processed video data from the module 108 may be provided to a video content server 102 of the video streaming system 102. In the alternative, or in addition, the module 108 may store processed video data in a memory, for example, data store 109. In addition, the module 108 may provide metadata to, and/or obtain metadata from, the data store 109 or other data source. The metadata may relate to objects appearing in the video data that the content preparation module has made interactive. For example, if certain faces appearing in the video data are recognized and prepared as interactive objects in the output video, the metadata may include biographical or other information relating to respective persons, e.g., actors, belonging to the recognized faces. The metadata may be related to the recognized face or object using one or more identifiers; for example, in the case of actors, the name and birthdate of each actor.

The video streaming system 100 may include one or more computer servers or modules 102, 104, and/or 106 distributed over one or more computers. Each server 102, 104, 106 may include, or may be operatively coupled to, one or more data stores 109, for example databases, indexes, files, or other data structures. A video content server 102 may access a data store (not shown) of various video segments. The video content server 102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 104 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 100, a public service message, or some other information. The ad server 104 may serve the video advertising segments as directed by a user interface controller (not shown).

The video streaming system 100 may further include an integration and streaming component 106 that integrates video content and video advertising into a streaming video segment. A controller (not shown) may determine the selection or configuration of advertising in the streaming video based on any suitable algorithm or process. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 112 and/or other network 114. Such client devices may include, for example, one or more laptop computers 122, desktop computers 120, "smart" mobile phones 126, notepad devices 124, network-enabled televisions 128, or combinations thereof, via a router 118 for a LAN, via a base station 116 for a wireless telephony network 114, or via some other connection. In operation, such client devices 120, 122, 124, 126, or 128 may send and receive data or instructions to the system 100, in response to user input received from user input devices or other input. In response, the system 100 may serve video segments and metadata from the data store 109 responsive to selection of interactive links to the client devices 120, 122, 124, 126, or 128 and customize the additional content based on parameters of the client devices, for example respective geographic locations of the client devices, or demographic information concerning respective users of the client devices. The devices 120, 122, 124, 126, or 128 may output interactive video content from the streaming video segment and game application using a display screen, projector, or other video output device, and receive user input for interacting with the video content based on one or more links associated with a tracked face or other object appearing in the video content.

Distribution of audio-video data may be implemented from a content server 106 to remote client devices over computer networks, telecommunications networks, and combinations of such networks, using various methods, for example progressive downloading or streaming. In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming media server 106 may communicate with the client device using control messages and data messages to adjust to changing network conditions as the video is played. These control messages can include commands for enabling control functions such as fast forward, fast reverse, pausing, or seeking to a particular part of the file at the client.

Since a streaming media server 106 transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Output from a media player on the client device may occupy only a portion of total screen area available on a client device, particularly when bandwidth limitations restrict the resolution of streaming video. Although media players often include a "full screen" viewing option, many users prefer to watch video in a display area smaller than full screen, depending on the available video resolution. Accordingly, the video may appear in a relatively small area or window of an available display area, leaving unused areas. A video provider may occupy the unused area with other content or interface objects, including additional advertising, such as, for example, banner ads. Banner ads or similar additional content may be provided with links to an additional web site or page, so that when a user "clicks on" or otherwise selects the banner ad, the additional web site or page opens in a new window. Additional screen space, when available, may also be used for displaying additional information responsive to selection of links associated with face tracks in video content, as described in more detail elsewhere herein.

Referring to FIG. 2, a diagrammatic view of an apparatus 200 for processing video content to enable interactivity based on objects appearing in video image data 200 is illustrated. In selected embodiments, the apparatus 200 may include a processor 202 operatively coupled to a processor memory 204, which holds binary-coded functional modules for execution by the processor 202. Such functional modules may include an operating system 206 for handling system functions such as input/output and memory access. The modules may include an object detection module 208 for processing image frames of video data to detect specific objects, for example human faces, appearing in one or more image frames. The module 208 may include sub-modules or functions as described herein, for example, a shot boundary detection module and a face detection module. The modules may further include an object tracking module 210 for tracking detected objects through multiple frames of a video shot, and a configurator module 212 for configuring the video data to include one or more links to additional information about a detected object. The memory 204 may hold additional modules not shown in FIG. 2, for example modules for performing other operations described elsewhere herein.

A bus 214 or other communication component may support communication of information within the apparatus 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, 210 and 212 when the apparatus 200 is powered off, from which the modules may be loaded into the processor memory 204 when the apparatus 200 is powered up. The storage device 224 may include a non-transitory computer-readable medium holding information, instructions, or some combination thereof, for example instructions that when executed by the processor 202, cause the apparatus 200 to perform one or more operations of a method as described herein.

A communication interface 216 may also be connected to the bus 214. The communication interface 216 may provide or support two-way data communication between the apparatus 200 and one or more external devices, e.g., the streaming system 100, optionally via a router/modem 226 and a wired or wireless connection 225. In the alternative, or in addition, the apparatus 200 may include a transceiver 218 connected to an antenna 228, through which the apparatus 200 may communicate wirelessly with a base station for a wireless communication system or with the router/modem 226. In the alternative, the apparatus 200 may communicate with a content serving system 100 via a local area network, virtual private network, or other network. In another alternative, the apparatus 200 may be incorporated as a module or component of the system 100 and communicate with other components via the bus 214 or by some other modality.

The apparatus 200 may be connected (e.g., via the bus 214 and graphics processing unit 220) to a display unit 228. A display 228 may include any suitable configuration for displaying information to an operator of the apparatus 200. For example, a display 228 may include or utilize a liquid crystal display (LCD), touchscreen LCD (e.g., capacitive display), light emitting diode (LED) display, projector, or other display device to present information to a user of the apparatus 200 in a visual display.

One or more input devices 230 (e.g., an alphanumeric keyboard, microphone, keypad, remote controller, game controller, camera or camera array) may be connected to the bus 214 via a user input port 222 to communicate information and commands to the apparatus 200. In selected embodiments, an input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228. A cursor control device may have two or more degrees of freedom, for example allowing the device to specify cursor positions in a plane or three-dimensional space.

Referring to FIG. 3, general aspects of a process 300 used for enabling interactivity in video content based on objects appearing in image frames of the video data. The initial state 308 represents a set of sequential image frames making up a video segment, wherein the image frames include images of one or more unknown (i.e., unidentified) objects, for example persons. As such, the initial state correlates to a definite video output from a display device, i.e., a physical state, in which the objects are unidentified. The video segment may be associated with identifiers that may be used to locate data for recognizing objects in the video. For example, a video segment comprising a television episode or motion picture may be associated with metadata identifying one or more actors appearing in the video, e.g., actor names. Facial recognition data, for example sample images or facial measurement parameter sets, may be located by querying a database or other data structure using the metadata. The initial state 308 may be represented in a computer memory using an electronic video data format.

The process 300 is (or includes) an input-output computation process performed by a computer processor, which operates on the initial state 308 to output at least one final state 310. The process 300 may be implemented automatically with limited or no input from a human operator. In the alternative, in some embodiments, the process 300 may receive inputs from one or more human operators to perform selected tasks, for example quality control tasks. The final state 310 represents altered video data that includes at least one new link to information about a recognized object (e.g., face) appearing in image frames of the video data, wherein the link is positioned based on the location of the recognized object. The process 300 may therefore operate as a state machine that accepts the initial state 308 and optionally user input via an input device as inputs, and transforms the state data 308 representing a physical state of a video output device into a different final state 310 representing a different physical state of a video output device. Subsequently, the final output state 310 is realized in physical output from a client device that is configured based on the final output state to provide interactive video content including a link positioned relative to (e.g., on or near) the recognized object.

The process 300 may include several interactive modules, for example, a face detection module 302, a face tracking module 304 and a face recognition/content configuration module 306. The module 300 may include other modules, for example, a user interface module, communication module, graphics module, etc., which for illustrative simplicity are not shown. The face detection 302 module may operate to detect one or more faces appearing in a selected frame of video data. The object tracking module 304 may track the position of a detected face through sequential frames of the video data. The face recognition/content configuration module 306 may recognize the detected face and alter the video data to include an interactive link or other object positioned relative to the detected face along a track determined by the tracking module. The link may be configured to enable a media player component to retrieve and output information about the detected face, in response to user selection of the link. Accordingly, a viewer of the altered video may easily obtain more information about an actor appearing in a video by browsing for more information about the actor he is interested in using the newly added link.

Face detection and recognition within produced video content may hypothetically be performed by a team of knowledgeable persons examining all frames of a video and manually annotating all the faces appeared in these frames with human effort. However, a manual process does not scale up effectively and may be too labor-intensive for large scale implementation. A fully automated approach, on the other hand, may operate to detect faces in each image frame, using a facial recognition algorithm to automatically recognize the detected faces. However, current recognition algorithms may at best achieve approximately 80% accuracy, which may fall well below minimal user expectations for facial recognition. A semi-automatic process may combine the merits of both manual and automatic process, so as to maximize accuracy while minimizing manual inputs.

An automatic or semi-automatic process 300 may leverage face detection and tracking algorithms to connect detected faces into tracks and reduce computational requirements. The process may include a multi-view face detector to handle 180 degree in plane rotation and 180 degree yaw changes in face position, based on, for example, a few ten-thousand labeled examples. In one embodiment, a face detection algorithm may require 300 milliseconds to process a 640×360 frame, when executed on a personal computer using a Xeon® CPU E5420 @ 2.50 GHz. Thus, detecting in all video frames in this embodiment would require approximately 9 times longer than the duration for which the frame is displayed when a video is run at 30 frames per second (33.3 milliseconds). Such a pace of detection may be unacceptably slow or inefficient. Performing a face tracking process triggered by initial face detection may reduce computational requirements by associating isolated faces with continuous tracks. In this context, a "track of a face" or "face track" refers to a mathematical expression and/or data defining a position (and optionally extents) of a face image in each frame of a defined sequence of frames.

A face tracking process may be used to extend face tracks to frames well beyond an initial detection result. This may increase the length of time for which a face detection result is effective, without requiring the face detection process to detect face images in every frame. Face tracking may also greatly reduce the number of candidate objects for tagging as recognized face objects, for example by a factor of 100 or more, by enabling tagging of the face tracks instead of isolated faces in individual frames. To avoid a "drifting away" phenomenon in tracking where the terminus of a track is not properly defined, shot boundaries may be detected and used in connection with face detection and tracking. A "shot boundary" as used herein refers to the first or last frame of a sequence of frames that are recorded or rendered continuously from a particular camera or (in the case of animation or virtual environments) an apparent or simulated camera. Such sequences may be commonly referred to in the video recording industry as a "shot."

Various techniques may be used to reduce computation and human input required by the process 300. For example, video data may include rich contextual information that can be used to reduce computational and memory requirements for face tagging. When applied generally to thousands of video clips in an video content system, face detection and tracking may generate millions of face tracks for tagging. In contrast, traditional face recognition may be restricted to single image processing and requires a manually supervised environment for successful recognition. In addition, an online learning framework may be adopted to alleviate human work load further. Further details of the process 300 are provided in the disclosure below.

Referring to FIG. 4, a processing pipeline 400 for enabling interactivity in video content based on objects appearing in image frames of the video data may include various sub-processes as illustrated. A preliminary sub-process may include shot boundary detection 402. In shot boundary detection, an input video may be analyzed using a shot boundary detection algorithm to determine each shot boundary in the analyzed video. Then, each complete video frame (e.g., I-frame or keyframe) may be densely sampled in a multi-view face detection sub-process 404. Faces detected in the sub-process 404 may provide a start point for the subsequent face tracking sub-process 406. In the tracking sub-process 406, a tracking algorithm may be automatically applied to associate isolated single faces detected in a frame into connected groups of corresponding faces in adjacent tracks. After the face tracks are defined by the sub-process 406, a facial recognition and track tagging sub-process 408 may automatically determine an identifier for a person to whom the face belongs (e.g., a specific actor appearing in the video) and tag each face track with the identifier. Optionally, in a quality control inspection sub-process 410, human annotators may inspect the tags assigned to each track and correct any erroneous tags. Finally, at 412, the video may be altered to include an interactive link to additional information, wherein the additional information is selected based on the tag assigned to a face track. The link may be positioned in a video layer based on the face track.

The processing pipeline 400 has been successfully applied to automatically tag face tracks in a subject video of approximately twenty minutes duration, requiring a processing time of about four times the video play duration when implemented using the afore-mentioned processor. About 70% of actor faces appearing in the subject video were successfully identified with a false positive error rate of about 5%. Processing time may be reduced by using a more powerful processor or processors.

Further details concerning automatic algorithms for implementing shot boundary detection 402, face detection 404, face tracking 406 and track tagging 408 are provided in the disclosure below. Further details regarding the optional manual inspection sub-process 410 are not provided, because various suitable ways of implementing a manual inspection process for video tagging should be apparent to one of ordinary skill without requiring further description.

Shot Boundary Detection

Video may typically be composed of hundreds of shots, wherein each shot is made up of a continuous frame sequence captured in a single camera action. Shot boundary detection may be used to automatically locate an accurate boundary between two adjacent shots, without requiring any explicit definition of the shot boundaries from associated metadata or other source. In the processing flow 400, a video may first be divided into separate shots using shot boundary detection, and then face detection and tracking performed for each separate shot.

There are several kinds of boundaries between two adjacent shots. Shot boundaries may generally be categorized into two types: abrupt transition (CUT) and gradual transition (GT). CUT is usually easy to detect since the change on the boundary is great. However, gradual transitions are commonly included in videos and are more difficult to detect. Considering the characteristics of different editing effects, GT may be further divided into dissolve, wipe, fade out/in (FOI), and so forth. Because there is a smooth transition from one shot to another, it may be difficult for an algorithm to automatically detect and/or decide the position of the shot boundary. In addition, it may be difficult to detect a difference between GT and fast movement in a single shot, because the image variation from frame-to-frame may be substantial but smooth in both cases.

A workflow for shot boundary detection may include three steps which may be performed in sequence. Each step may be performed automatically using a processing module in video processing apparatus. In a first step, one or more features are extracted from video data to represent the video content. Video can be conceptualized as a three-dimensional signal made up two spatial dimensions and one time dimension. Comparing to a two-dimensional image, the extra dimension of video reflects the variations of video content along the time axes. To find the shot boundary, the video should be analyzed frame by frame. Each frame (e.g., I-frame or keyframe) may comprise a still color image with RGB channels.

One or more histograms based on image parameters may be extracted as representative features of a video frame. A color vector composed of color values of all pixels in a frame may also be representative; however, a color vector is very sensitive to movement and illumination. To eliminate sensitivity to illumination, the RGB (Red-Green-Blue) color space of a video frame may be transformed into a HSV (Hue, Saturation, Lightness) color space. To eliminate the sensitivity to movement, a color vector may be expressed as a color histogram. In the alternative, or in addition, a Local Binary Pattern (LBP) histogram may also be adopted to reduce sensitivity of the representative feature to variations in illumination. LBP is a texture descriptor based on a local geometric structure of image, and may be less sensitive to global illumination variation. To enhance robustness to noise, the uniform version of LBP histogram (HLBP) with 58 bins may be used, wherein the last (59th) bin is discarded as noise. An HSV histogram (HHSV) may include 72 bins, from the product of 8 (Hue), 3 (Saturation) and 3 (Value) quantized intervals.

In a second step, measurement of continuity across adjacent frames of a sequence may be developed, based on differences between the representative feature or features (e.g., LBP histogram or HSV histogram) in adjacent frames. The continuity measure may provide a quantitative indication of similarity between adjacent frames. A shot boundary may be detected by correlating minimums in the continuity measure to shot boundaries. The continuity measure may be considered as a one-dimensional temporal signal representing the video content.

In an aspect, the continuity measure may be developed by comparing adjacent sets of frames within a "window" of multiple frames. If the continuity measure is made only between two adjacent frames, gradual transitions may not be accurately detected because the variation between two adjacent frames may be small in this kind of transition. Thus, a larger window may be used to compute the continuity measure. FIG. 5 illustrates a window of 'K' frames 502, 504 sequenced along a time axis 500. The number 'K' may be an even integer greater than two, for example in the range of eight to 100. 'K' may be selected to be substantially lower than a minimal number of frames typically required for a shot. If most shots are longer than one second, for example, 'K' may be 30 or less. In the depicted example, 'K' is equal to fourteen and a shot boundary happens to be present after the first seven frames. Hence, half of the frames in the window of 'K' frames are in a pre-boundary set 502 and the other half in a post-boundary set 504. It should be appreciated, however, that a shot boundary may occur anywhere in the window, or the window may not include any shot boundary.

The processor may use a histogram intersection method to measure the similarity of an arbitrary frame pair selected from the window of 'K' frames, weighted in inverse proportion to the distance 'n' between two frames in the pair. For example, a first frame 506 is four frames away from a fifth frame 508; a comparison (e.g., histogram intersection) between the frames 506 and 508 may yield a first similarity measure. The first frame is ten frames away from an eleventh frame 510; a comparison of these two frames 506, 510 may yield a second similarity measure that is weighted less than the first similarity measure because of the greater distance between the frames. A similarity measure may be obtained for every unique frame pair in the window.

Conceptually, the resulting weighted similarity measures between frame pairs may be represented by a graph 600 of the 'K' frames within the window, a simplified illustration of which is provided by FIG. 6. The graph includes 'K' nodes (e.g., node 606) with each node connected to all 'K–1' other nodes by an edge (line segment) having a length correlated to the weighted similarity measure. The conceptual graph 600 is therefore characterized by a total of K*(K–1) edges; many edges are omitted from FIG. 6 for illustrative simplicity. The graph 600 may be divided into separate segments 602, 604 by removing the edges between these segments. Such division may be referred to as a "cut," and may be defined by the set of edges the removal of which divides a graph into disconnected segments. A cut between the segments 602, 604 (e.g., between frame subset 'A' 502 and the second frame subset 'B' 504) may be represented symbolically as cut(A,B).

Within any given segment of a graph, a measure of total normalized association may be defined as the sum of the edge values within the segment. As noted, the edge values represent the weighted similarity measures between frames. The total normalized association of a given segment 'A' (e.g., segment 602) may be represented symbolically by assoc(A). A K*K weighted similarity matrix 700, as shown in FIG. 7, may be used to compute a normalized cut of the graph 600.

A normalized cut may be defined as a cut that is adjusted or normalized based on segment size, such that segment size does not interfere with determining an optimal cut, which should correspond to a minimal cut value. Computationally, a processor may determine a normalized cut '$C_N$' of any given cut(A,B) between segments 'A' and 'B' using the relation:

$$C_N = \frac{cut(A, B)}{assoc(A) + cut(A, B)} + \frac{cut(A, B)}{assoc(B) + cut(A, B)},$$

wherein assoc( ) and cut( ) have the meanings described above. To locate a shot boundary, a processor may divide a window of 'K' frames into equal subsets of K/2 frames, segments 'A' and 'B' respectively. The processor may calculate the value of $C_N$ for cut(A,B) the using the foregoing equation, and save the value in a computer memory. This may be repeated for successive windows moved by increments of one or more frames along the video timeline, with the processor calculating the normalized cut based on subsets of equal halves at each increment, and storing the result. As the window moves along the time axis 500, the resulting sequence of stored normalized cuts traces out a substantially continuous curve. At a shot boundary, regardless of whether the shot transition type is gradual or abrupt, the normalized cut curve should be characterized by a minimum having a discernibly sharp peak.

Since HSV and LBP histograms may both be used for determining a similarity measure, two independent normalized cut curves may be obtained for each of the histogram types. To reduce the number of undetected boundaries, the processor may calculate a product or other combination of normalized cut curves. FIG. 8 shows an example of such a combined curve 802 in the graph 800, wherein the combined value of the normalized cut is shown on the vertical axis and the frame count on the horizontal axis.

In a third step, a processor may determine a position (and type) of shot boundary, based on a normalized cut curve for a moving frame window. Various approaches may be applied to determine the shot boundary. One approach may use a pre-defined threshold to classify the curve into two categories. Another approach may use machine learning techniques to train an algorithm to adopt an optimal classification, which may provide a more adaptive and robust solution.

The first approach may be implemented where there is a lack of available data for training a classification algorithm. In an aspect of this embodiment, a reference "normalized cut" curve may be developed by assuming the frames in the computational window are all black (or other uniform color), and then defining a reference continuity curve for the uniform color. Referring again to FIG. 8, the horizontal line 804 represents a threshold such as may be obtained by multiplying the reference continuity curve by an empirical constant coefficient. An algorithm may detect the shot boundary at the frame count corresponding to each minimum in the curve 802 that occurs below the threshold 804. For example, the minimum 806 occurs at about frame number 120, which the algorithm may select as a shot boundary. Other candidate shot boundaries are also apparent in the example 800. The threshold 804 may be adjusted empirically to optimize reduction of false positives (i.e., detecting a non-existent shot boundary) and false negatives (i.e., failing to detect an actual shot boundary). Subsequently, when processing the video data for face detection and tracking, each instance of detection and tracking may be constrained between adjacent shot boundaries.

Face Detection

Figure 9A:
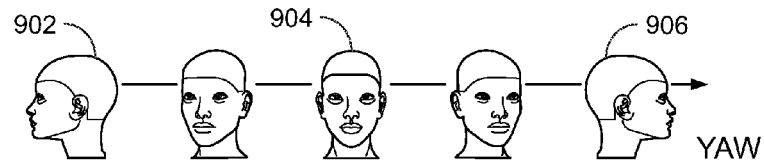
FIGS. 9A-B are diagrams illustrating facial rotational variations such as out-plane and in-plane rotations which may occur in a video frame.
Figure 9B:
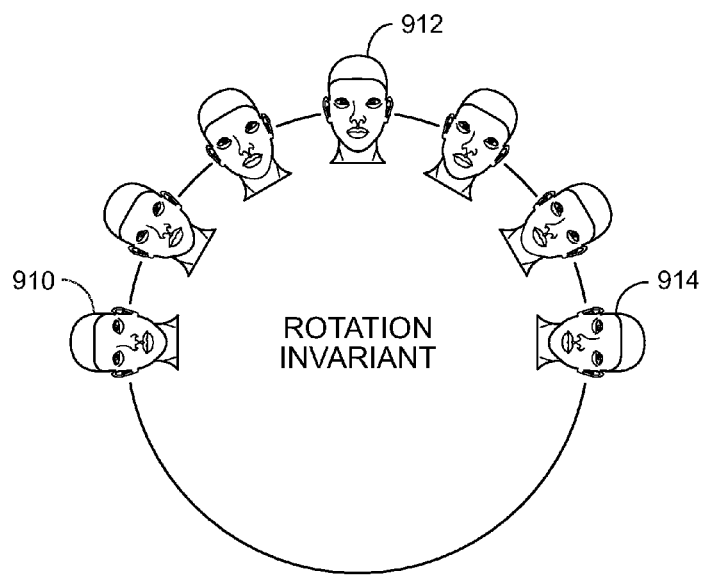

Face detection should be capable of handling rotation of the face around independent axes. Detection of frontal faces as well as faces in profile may be indispensable for tracking a face as it rotates in the camera view, as such rotation may commonly be present in high production-value video. FIGS. 9A and 9B illustrate various poses that face detection should be capable of handling, where yaw refers to different profile angles ranging from –90° 902 to full frontal 904 to 90° 906, and rotation refers to in-plane rotation from –90° 910 to upright 912 to 90° 914. Pitch (e.g., leaning forward or back) may also be considered. Face detection may exclude detection of faces posed in unusual positions (e.g., upside-down) to reduce computational requirements without materially reducing effectiveness.

Incorporating such variances in face detection may complicate process design. Care should be taken to design the algorithm and parameters to achieve balance among accuracy, false detection rate and running speed. In general, face detection is the most processor intensive and time consuming operation required for performance of the method.

Figure 10:
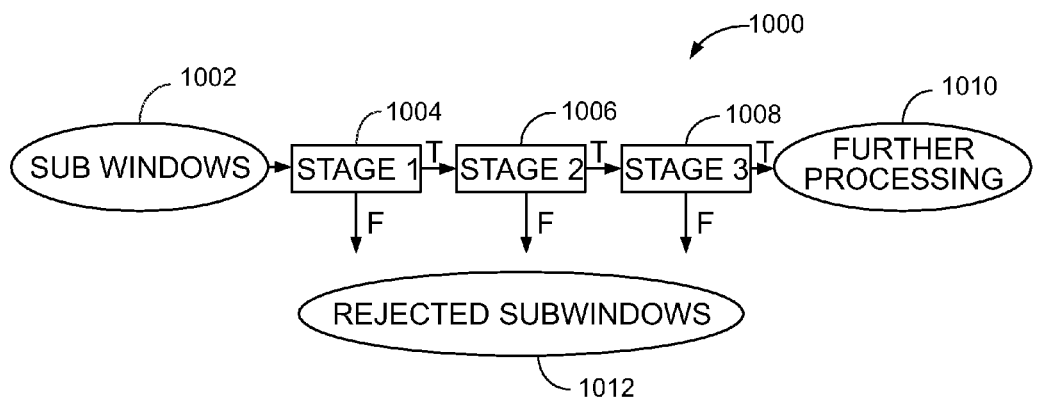
FIG. 10 is a diagram illustrating a process for sub-window filtration that may be used in facial detection.

Face detection is a well studied problem with a long research tradition. One state-of-the-art detector follows a sliding window approach to exhaustively scan all possible sub-windows in one image while using a cascade boosting architecture to quickly filter out negative examples. FIG. 10 illustrates aspects of cascaded classifiers for such detection processes. Each stage 1004, 1006, 1008 (stage 1, stage 2, stage 3) represents a classification module that scores the sub-windows 1002 generated by a sliding window. Windows with scores below a certain threshold may be discarded 1012 and only those ones with scores greater than the threshold passed for further processing 1010. Although three stages are illustrated, many more stages may be used in practice. With carefully designed classification modules, a face detection module may filter a certain portion of negative examples without falsely rejecting many truly positive examples. Though the number of sub-windows can be huge for a typical video frame image, most of the windows are negative examples and will run through only one or two stages. Thus the process is quite efficient for a single face pose.

Figure 11:
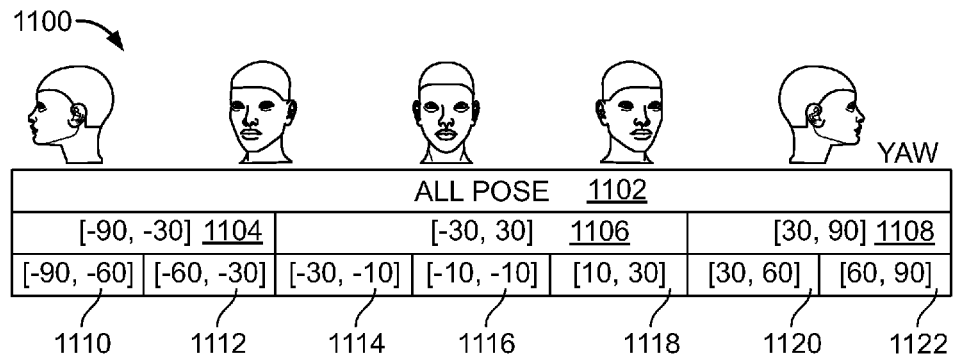
FIG. 11 is a diagram illustrating a pose variation hierarchy that may be used in facial detection.

However, parallel processing different face detectors for multiple poses ignores the structure of the face pose space and is inefficient. To facilitate feature and detector sharing among different poses, various hierarchical detector structures may be implemented. A pyramid structure may provide a simple and independent training process for the underlying component detectors. Pyramid structure is a coarse-to-fine partition of multi-view faces. FIG. 11 illustrates a pyramid structure 1100 for a yaw-based partition process. Instead of running all specialized detectors in parallel, a top or initial process 1102 classifies the face pose space into intermediate categories 1104, 1106, 1108. The intermediate level detectors 1104, 1106, and 1108 operate in parallel to further classify the pose space into more finely divided classifications 1110, 1112, 1114, 1116, 1118, 1120 and 1122. Low or base level detectors 1110, 1112, 1114, 1116, 1118, 1120 and 1122 then operate in parallel to detect faces in the classified pose spaces.

Figure 12:
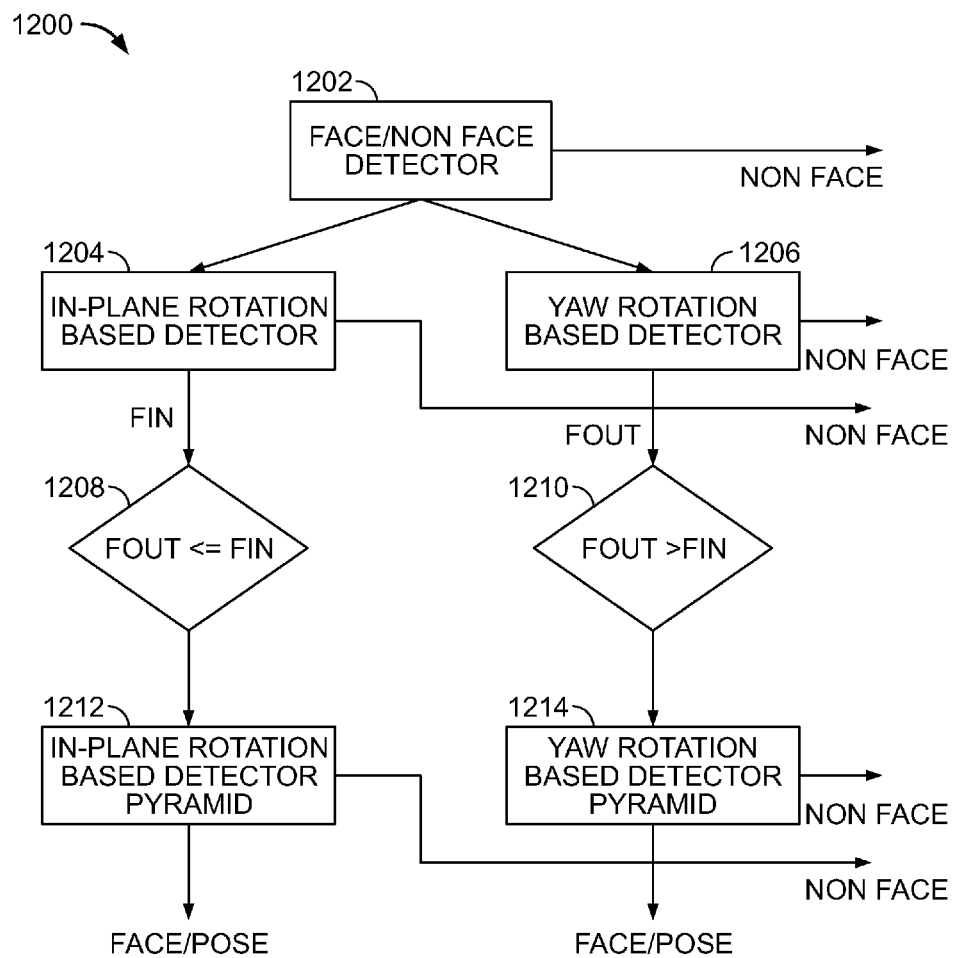
FIG. 12 is a diagram illustrating further aspects of sub-window filtration that may be used in facial detection.

Dealing with in-plane rotation and yaw rotation in the same video data introduces additional complexities. FIG. 12 illustrates a branching process 1200 that may be used to handle such complexities. The branching process 1200 may be used by a processor to determine whether a given example will be processed by an in-plane rotation detector 1204 or a yaw rotation detector 1206. Initially, a five-stage all-pose face/non-face detector 1202 may be trained and operate as the root node for the process 1200. Two detectors 1204, 1206 may be trained to detect in-plane rotation and yaw rotation respectively, each with 10 stages. The outputs of these two detectors 1204, 1206 may be compared 1208, 1210 to select a subsequent branch. After that, the problem is converted to the solved problem of rotation in one dimension, for example, in-plane rotation or yaw rotation. In a given branch 1212 or 1214, the same coarse-to-fine strategy illustrated by the pyramid process 1100 may be used. The final output incorporates both face position and face pose estimation.

Haar wavelet features may be used in face detection for simplicity and effectiveness. However, Haar features may often require tens of thousands of dimensions. During training, a boosting procedure iterates over all possible features to decide the next weak learner. Correspondingly, at detection time, a large number of features have to be extracted. In contrast, an LBP feature may be converted to a sparse 58 bin histogram, either locally or globally. As stated before, LBP captures the local image geometric structure and is less sensitive to global illumination variations. Thus, an LBP histogram may also be a useful feature for face detection.

A boosting framework may also be used for training the classifier stages. A RankBoost-like reweighting scheme may be applied in each round to balance the weights for positive and negative examples. "RankBoost" refers to an efficient boosting algorithm for combining preferences such as disclosed by Freund, Iyer, Schapire and Singer in the Journal of Machine Learning Research 4 (2003). Such training is useful to tune the classifiers to focus more on the often limited number of positive examples. A nested cascade structure may be used to further reduce the number of weak classifiers needed in the detector. Synthetic examples like flipped, random small variations, scale, and rotational transform may be created to enlarge a library of positive examples for training. In training, multiple threading techniques may help the algorithm to detect a face more quickly.

In one embodiment implemented as described above, a multi-view face detector detected faces in about 300 ms for 640×360 resolution images. Detection accuracy was about 80% for frontal faces and 60% for profile faces, both at 5% false detection rate. With further refinements to the detection algorithm, accuracy may be improved.

Face Tracking

Face tracking refers to tracking the detected face in a video or a continuous image sequence from a start point (position, scale, rotation, expression and so on) provided by face detection and/or face alignment techniques. Face tracking may be implemented online or offline. In online mode, the face is tracked while the video is being captured. Thus, only current and previous frames can be used to exploit information for tracking and the efficiency requirement is strict. In offline mode, the whole video file is generated ahead of time. Therefore, the information of any frames can be used to guide the tracking. The embodiments described below implement tracking in offline mode, and limit tracking to the position and scale of the detected face.

Face tracking is useful for several reasons. Video is generally composed of tens of thousands of frames. To locate a face in each frame, one simple idea is to perform face detection frame by frame. Since complex head rotation should be covered (both in-plane and out-plane rotations), the face detection may require more than 0.3 second per frame for a video frame of relatively low resolution (e.g., 360 by 640). If the frame rate is about 30 fps, this means that the duration of processing a video may be more than 9 times of that of the video itself, which may be infeasible in practice. In addition, the faces of the same person in successive frames cannot be associated by detecting faces separately in each frame. Thus, in subsequent face clustering or face recognition processes, the amount of input face samples is multiplied greatly by the number of individual frames in which a face is detected.

Considering the continuity of video along time axis and the redundancy between adjacent frames, face tracking can be employed instead of face detection in each frame. Since face tracking is very computationally efficient, the time cost can be significantly reduced. Moreover, the faces of the same person in different frames can be linked by the face tracks. Thus, for each face track, only one face sample is needed in subsequent face clustering or recognition, which can be selected from the track to represent all the samples in this track. In addition, when a false negative occurs during face detection, face tracking may detect such false negatives by determining that the false negative cannot be tracked.

A face track may be indicated by a visual object placed in the video frame, for example by a box enclosing the area just around the detected and tracked face. To provide good user experience, such tracking indications should vibrate as little as possible along the time axis. Vibration damping for the visual tracking indicator may be easily attained by face tracking based on time relevance of adjacent frames.

Face tracking may be implemented using any suitable method designed for object tracking, for example, optical flow, mean shift and particle filter. Considering the efficiency required for processing thousands of videos, optical flow may be a preferred method. Optical flow is based on the object appearance and nonlinear least square optimization. If the rate of change in appearance of the object is sufficiently low, the tracking performance will be very good without vibration. In addition, optical flow should be able to handle many motion parameters not limited to transition and scale, for example three-dimensional (3D) rotation angles and facial expression parameters (e.g. active appearance models). On the contrary, since mean shift and particle filter are sampling-based approaches, high parameter dimension may lead to dimensionality problems.

By adopting an inverse compositional technique, solution for optical flow may be very efficient. Optical flow makes use of continuity of adjacent frames with three assumptions. First, the appearance of the target object is assumed to be similar or the same in adjacent frames. Second, the target object is assumed to have a complex texture. Third, the variation of pose parameters (translation, scaling, rotation) is assumed to be small between respective frames. For face tracking in a video stream, the above three assumptions are generally satisfied.

Given a face box for a detected face in a first frame, optical flow optimizes the appearance difference between face areas in adjacent frames to find the best face box in the next frame. The parameters to describe a face box may include translation and scale. To solve a non-linear least square problem, the parameters may be obtained iteratively. Some further considerations may be as follows:

First, to alleviate the sensitivity of illumination, intensity of gradients $g_{x,y}^2$ as appearance descriptor $a_{x,y}$ may be normalized since it is also simply computed. The original intensity of gradients may normalized by a sigmoid function to limit its dynamic range in [0, 1] using the relation $$a_{x,y} = \frac{g_{x,y}^2}{g_{x,y}^2 + \overline{g_{x,y}^2}}.$$

Second, to cover large displacement of faces both in and out of the image plane, a multi-resolution strategy with pyramid structure may be employed.

Third, a two step tracking strategy may be used: 1) track only translation of the face area using pyramid structure; 2) track translation and scale synchronously in single resolution.

Fourth, to avoid the track drifting into background, an online learning model may be adopted in the second step above. Each pixel in the appearance of face area may be modeled as a Gaussian distribution with the mean and variance updated during the tracking. If the track error is greater than a pre-defined threshold, the tracking may be terminated.

As noted above, preprocessing for tracking may include face detection and shot boundary detection. Face detection provides a start for face tracking and shot boundary detection limits the face tracks laid in the same shot. Thus, before tracking, there may be several detected face boxes in different frames of each shot. A tracking algorithm may be used as follows:

1. Sort all the detected face boxes in one shot. A frontal face may be assigned a higher priority than a profile face. A box with large scale may be assigned a higher priority than that with small scale.
2. Each box may have a flag set to indicate whether it has been tracked or not. If flag is 0, the box hasn't been tracked, otherwise it has been tracked. All the flags are initialized with 0.
3. At each iteration, the untracked box with the highest priority is selected as a start point of a new track and its flag is turned to 1.
   a) Track faces from the start point both forward and backward by optical flow.
   b) If the track encounters (which may be defined by overlapping more than a specified amount) another detected box, do the following:
      i. If flag of the box is 0, turn it to 1 and keep tracking, and adjust the track by the box.
      ii. If flag of the box is 1, stop tracking.
   c) If the tracking error reaches a predefined threshold, stop tracking.
   d) Merge both forward and backward tracks into one track.
4. If the flag of all the boxes in a shot is 1, merge the tracks spatially, since there may be more than one track going through the same face in some frames.
   a) In each frame, all the tracked boxes are clustered into fewer categories.
   b) Find the relation among tracks and which tracks are overlapped.
   c) Merge the overlapped tracks.
5. Merge the tracks along time axis if two tracks are temporally adjacent and spatially overlapped.
6. Use linear smoothing technique to reduce the vibration further to improve the user experience. This vibration is caused mainly by the adjustment during the tracking and the merging processes.

Figure 23:
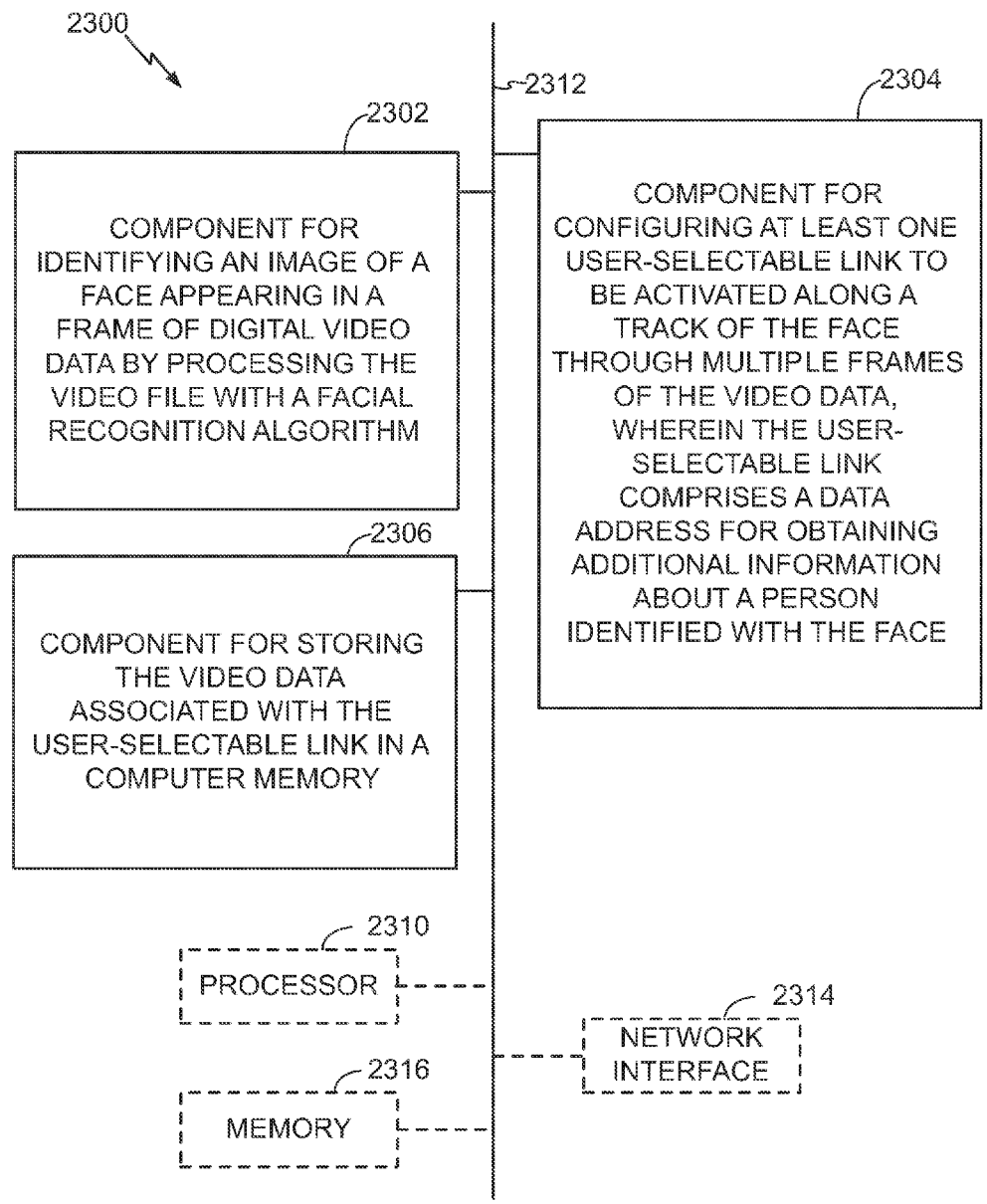
FIG. 23 is a diagram illustrating a video processing apparatus adapted for configuring video content with interactive features based on facial detection, tracking and recognition.

FIG. 23 shows one example of an output video frame 1300 with face tracking indicators 1302, 1304, 1306 and 1308 placed just around four different detected and tracked faces. By tagging these tracks based on an identity of a person to whom each tracked face belongs, interactivity may be enabled for the face tracking indicators 1302, 1304, 1306 and 1308.

Track Tagging

Given face tracks extracted from videos, it is desirable to tag these tracks automatically with some candidate actor names from the associated production. Otherwise, manually processing all the tracks would be time consuming. The tags, with some acceptable accuracy rate, for example 70%, provide valuable cues for human to verify the tracks in groups. A user-friendly interface may be provided to improve efficiency of checking and correcting erroneous tags. In the alternative, or in addition, human involvement may be reduced or eliminated to the extent that the accuracy of automatic tagging can be improved. Such improvement may fall into the machine learning framework which is widely adopted in the computer vision research community. In the present disclosure, automatically annotating faces (not tracks) is referred to as face tagging.

Traditionally, face verification technology tries to identify whether a given image belongs to a specific person in a set of candidates. Though successfully applied in controlled environments, the approach may require controlled illumination conditions, frontal pose and no occlusion. However, these conditions do not hold in in many video production environments, e.g., for example, television and motion picture production.

In the machine learning framework, the problem of track tagging may essentially reduce to constructing a proper track similarity function as a function of the similarity of the faces that are being tracked. When the dataset for face verification is relatively large, the time and labor for human verification may become unacceptably high. Improving the track tagging accuracy achieved by an automatic algorithm may significantly reduce the time and labor required for quality control verification. Several factors may affect the tagging accuracy: 1) features selected, 2) learning approach, and 3) the cold start problem. Each of these factors is treated in more detail in the disclosure below. On the other hand, when processing a very large dataset, the algorithm may also be constrained by available processing time. Given a large number of videos available for processing, processing time should be reduced to less than 1 second per face image. Thus, effective yet computationally-intensive methods such as dense local feature-based methods may not be practical for video processing in general.

Facial Features Extraction

Figure 14:
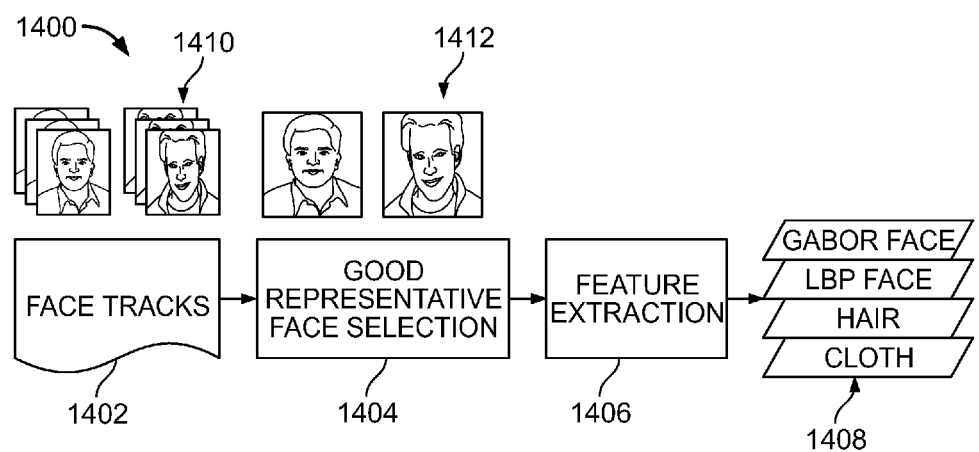
FIG. 14-15 are diagrams illustrating aspects of a process for unsupervised facial clustering.

Various kinds of information may be used to improve the tagging accuracy. For example, temporal information provided by the continuous face tracks may be used. Such tracks may be fused into a 3-D face model, or faces may be sampled at different points along a face track to obtain more details about a face to be identified. FIG. 14 illustrates a process 1400 in which representative face images 1410 are selected from face tracks 1402. In the process 1400 discussed below, a processor performing track tagging may construct a track similarity function as a function of similarity of representative faces 1410 selected at various points along a face track.

At 1404, the processor may select face images at random or defined intervals along the track to provide candidate images, and compare the candidate images based on image quality, pose orientation, and/or facial expression to select the best representative image or images for identifying. The processor may first resize each representative image to ensure the face region is some standard size, for example, 40×40 pixels. Next, the processor may enlarge the selected region to 40×80 pixels by extending 20 upper pixels and 20 lower pixels respectively, as shown in FIG. 14 at 1412.

At 1406, the processor may then extract standard face features used in facial recognition, such as Gabor and LBP (local binary pattern), on the 40×40 face region. The Gabor feature may be extracted on aligned facial images with a 16×16 grid layout, wherein each grid contains a 32-dimension feature from Gabor filters. Because the pixel-wise Gabor responses are sensitive to displacement, an average pooling scheme may be used to filter the pixel-wise Gabor responses for each grid and each Gabor filter. The LBP feature may be extracted from a representative face image with a 4×4 grid layout, and a 58-dimension histogram may be accumulated for each grid using a different LBP code. These local histograms may be concatenated into a vector of 928 dimensions. The extracted features 1408 may be used for pattern matching against a database of features to identify a particular face image.

A few face verification approaches requires face alignment and face warp as a preprocessing step. The alignment process identifies landmark points in the face, e.g. eye corner, mouth and nose. Then the face can be warped to the frontal position by triangulating the face areas and finding the affine mapping. Therefore, Gabor features can be extracted on the warped faces as well. However, alignment and warping may not improve accuracy of identification very much, depending on the fragility of the alignment algorithm used.

In an aspect, the process 1400 may be designed based on an assumption that a given character will have a generally consistent appearance (e.g., costume, hair style) throughout a given video program. Such an assumption may be more or less valid depending on the nature of the video program being analyzed; for example, it may be less likely to be a valid assumption for motion pictures than for television episodes. Where such an assumption is reasonable, additional features such as costume color, hair color, etc., may be included in the process 1400 as identifying features, within a particular video program or scene. For example, the processor may extract texture and color features in respective areas of the face image to reflect hair and clothes. The LBP feature may also be extracted on the full 40×80 region to represent the face and surrounding areas of hair and clothing. The optimal weights among different modalities may be learned afterwards with some label information for faces. Other identifying features may include, for example, audio information from a soundtrack, which may be compared to a script for the video program if available or voiceprint information to determine the identify of a face correlated to the audio information.

A Machine Learning Approach

Machine learning may be used to better construct a proper track similarity function as a function of the similarity of the underlying faces across the tracks. Given a new input video program for face tagging, face tracks for an actor may be more similar to tracks from the same actor in this specific video than tracks of the same actor from other videos. This may occur because the appearance of the actor is more likely to be the same in any given production. Thus, label information for face tracks already identified in the current video may be more valuable for use in similarity identification than face tracks from other videos of other programs involving the same actor (e.g., different episodes or series of a television program). With these labels from the same video program, greater tagging accuracy might be achieved by similarity to face tracks within the same program. Accordingly, an online learning scheme may be configured to incorporate the newly verified track labels from the current video at the earliest time.

As a system may need to handle several tens of thousands of actors, building and maintaining a supervised model for all possible actors may not be feasible even though no more than about only 100-500 actors may be expected to appear within a given video program. For an online learning environment handling a large number of candidates, a k-Nearest Neighbor (kNN) based lazy-learning approach may be used to annotate the faces independently and then vote among the face tags to determine the tag for the given track. The merit of such lazy-learning is that the tagging system does not need to maintain any learned model and the newly acquired labels can be added instantly. An approximate kNN scheme may be used to speed-up the neighbor finding process.

For example, a face tagging process may proceed as follows: For each target face 'F,' retrieve top 'k' recognized neighbor faces to tag the face 'F.' Then each neighbor face is assigned a weight to describe 'F'. Supposing that 'F' can be represented by linear combinations of its nearest neighbors, the identity of face 'F' is more likely to be the same as the identity of its highest-weighted neighbor. An "L2" norm is used in the similarity metric because an "L1" norm results in a worse performance and is far less efficient. A "norm" is a function that assigns a strictly positive length or size to all vectors in a vector space, wherein the "L2" norm is given by a square root of the summation of each vector element squared, and the "L1" norm is given by the summation of the absolute value of each vector element. Faces with different poses may all be treated the same way, provided that the database for comparison is large enough to include neighbor faces with the same pose.

A voting algorithm for track tagging may be configured as follows. Greater weight may be assigned to frontal faces as they are more reliable in voting. A Gaussian window may be used to weight posed faces. The frontal faces may be assigned the largest weight in a vote for face track identity. The full profile faces may be assigned the lowest weight.

After automatic tagging, the face tracks may be presented to human annotators for verification. Corrected labels from human quality control may be feed back into the system to further improve the tagging accuracy.

Cold Start

The cold start phenomenon is frequently discussed in the research for recommendation systems wherein due to lack of information for a newcomer to the system, no cue is available for deciding which items to recommend. Similarly, when a new show or a new actor is first introduced into the system, the system has no labeled information and thus supervised learning is not feasible. In such a situation, the system may use unsupervised learning and semi-supervised learning approaches to provide the initial labels for a few tracks to the system. Such learning may be done with assistance from manual input by a human operator.

Figure 15:
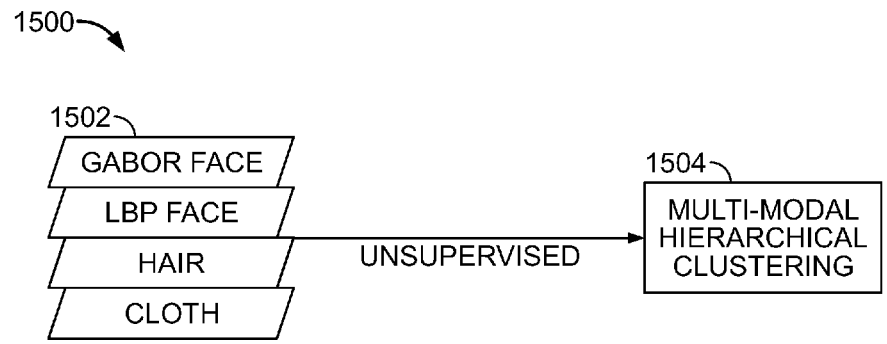

FIG. 15 illustrates one possible process 1500 based on multi-modal hierarchical clustering 1504. The aforementioned features for the faces 1502 are extracted and the track similarity is calculated based on the extracted features. Then a hierarchical clustering process 1504 is carried out to group the tracks into different clusters. Since tracks from the same actor are similar to each other, the probability of assigning these tracks to the same cluster is much higher than pure random assignment.

Figure 16:
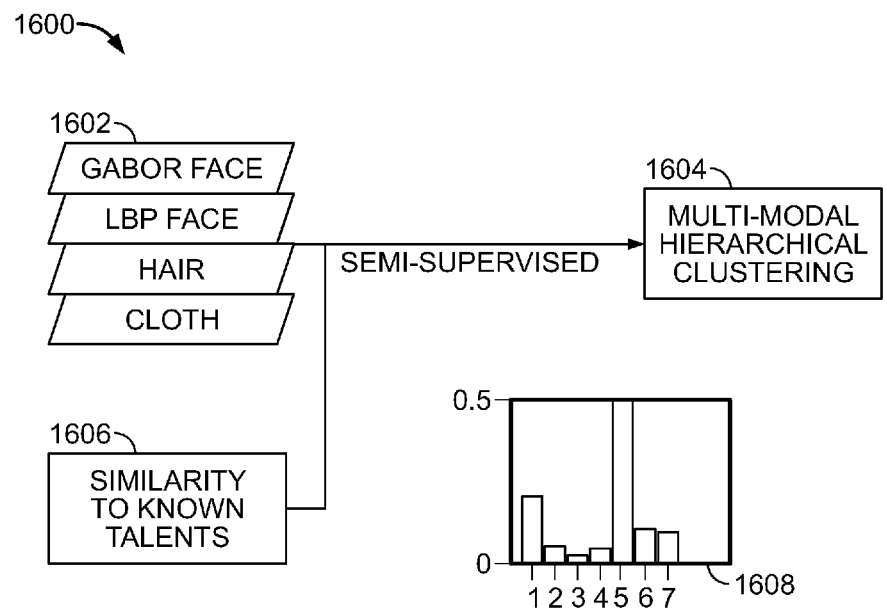
FIG. 16 is a diagram illustrating aspects of a process for semi-supervised facial clustering.

FIG. 16 illustrates an alternative process 1600. Although the system does not have label information for a new show or a new actor, it typically does have labels for other actors in other shows. Thus, with a few pre-built classifiers for each of the known actors, a similarity vector may be constructed 1606 to measure the similarities of the current face track to face tracks for a given set of known actors. The similarity vector may be combined with extracted facial features 1602 via the hierarchical clustering process 1604 carried out to group the face tracks into different clusters. The graph 1608 illustrates an example of one track's classification scores to a list of known actors. The similarity vector may encode some prior knowledge in the system, so this semi-supervised learning scheme 1600 may outperform the unsupervised scheme 1500. Experimental results show that the semi-supervised scheme increases 30% of the purity score for the clusters over the unsupervised scheme.

Some conclusions may be drawn from experience in applying the foregoing concepts to developing annotated face tracks for interactive video. In general, combining face features and context features for hair and clothes improves the annotation accuracy. Online active learning scheme perform better than offline learning schemes. The semi-supervised scheme improves solutions to the cold start problem and therefore helps the annotation.

Figure 13:
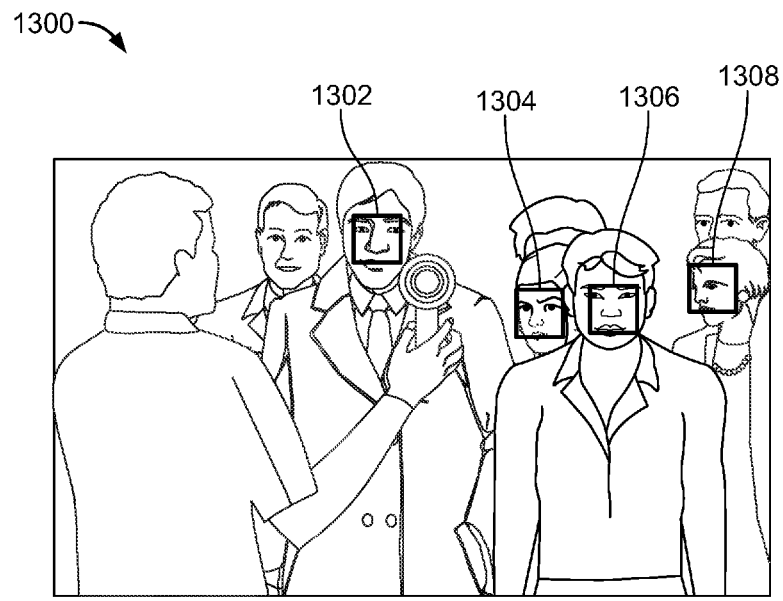
FIG. 13 is a screenshot showing an example output of a facial detection process of a video frame.

Once a face track is tagged, the tag can be used to configure a visible link to further information about the actor. For example, a video layer may be configured with visible indicators of face tracks, such as the face boxes shown in FIG. 13. By turning on this layer and selecting a face track (e.g., by "clicking" or otherwise selecting an area within a face box) a viewer may obtain information about the tagged actor, for example, biographical information appearing in a separate window or screen area.

Example Metholodgies and Apparatus

The foregoing examples and details may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Figure 17:
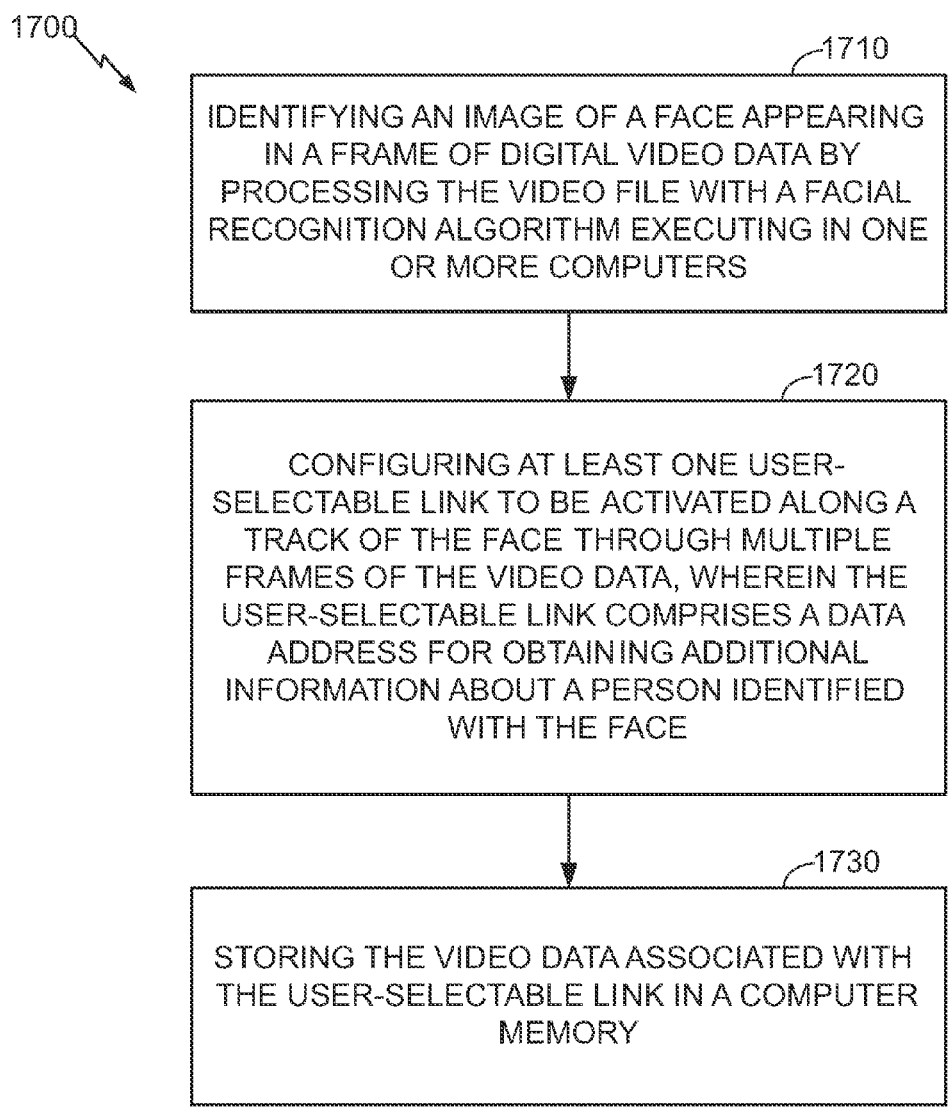

As shown in FIG. 17, a computer may perform a method 1700 for providing interactive video content including information linked to face tracks. The method 1700 may include, at 1710, detecting a face (e.g., a facial image) appearing in a frame of digital video data by processing the video file with a facial detection algorithm executing in one or more computers. The facial detection algorithm may operate to detect a facial image, but at least initially, need not identify a person to whom the face belongs. Identifying a person to whom the face belongs, sometimes referred to as facial recognition, may be performed separately later in the method 1700 or in a related operation (e.g., at operation 2240 shown in FIG. 22). Although facial recognition may be combined with facial detection, it may be advantageous to defer facial recognition to a later stage for greater computational efficiency. The method 1700 may further include, at 1720, configuring at least one user-selectable link to be activated along a track of the face through multiple frames of the video data, wherein the user-selectable link comprises a data address for obtaining additional information about a person identified with the face. The method 1700 may further include, at 1730, storing the video data associated with the user-selectable link in a computer memory.

With reference to FIGS. 18-22, several additional operations 1800, 1900, 2000, 2100, and 2200 are depicted for interactive video content including information linked to face tracks, which may be performed by a computer server, alone or in combination with a client device and/or another server. One or more of operations 1800, 1900, 2000, 2100, and 2200 may optionally be performed as part of method 1700. The elements 1800, 1900, 2000, 2100, and 2200 may be performed in any operative order, or may be encompassed by a development algorithm without requiring a particular chronological order of performance Operations can be independently performed and are not mutually exclusive. Therefore any one of such operations may be performed regardless of whether another downstream or upstream operation is performed. For example, if the method 1700 includes at least one of the operations 1800, 1900, 2000, 2100, or 2200, then the method 1700 may terminate after the at least one operation, without necessarily having to include any subsequent downstream operation(s) that may be illustrated.

Figure 18:
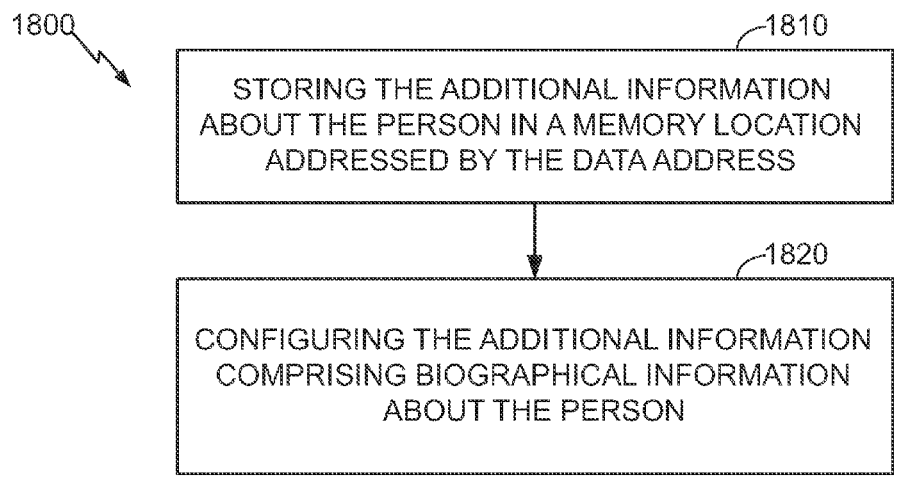

In an aspect, with reference to FIG. 18, the method 1700 may further include additional operations 1800 for handling additional information about an actor tagged to a face track. The additional operations may include, at 1810, storing the additional information about the person in a memory location addressed by the data address. For example, the information may be stored in a web page or the like referenced by a Uniform Resource Locator (URL). The additional operations may include, at 1820, configuring the additional information comprising biographical information about the person. The additional information may include a variety of other information, for example, links to other videos in which the person appears, photo libraries showing the person, links to other resources concerning the person such as a "fan page," or other information.

Figure 19:
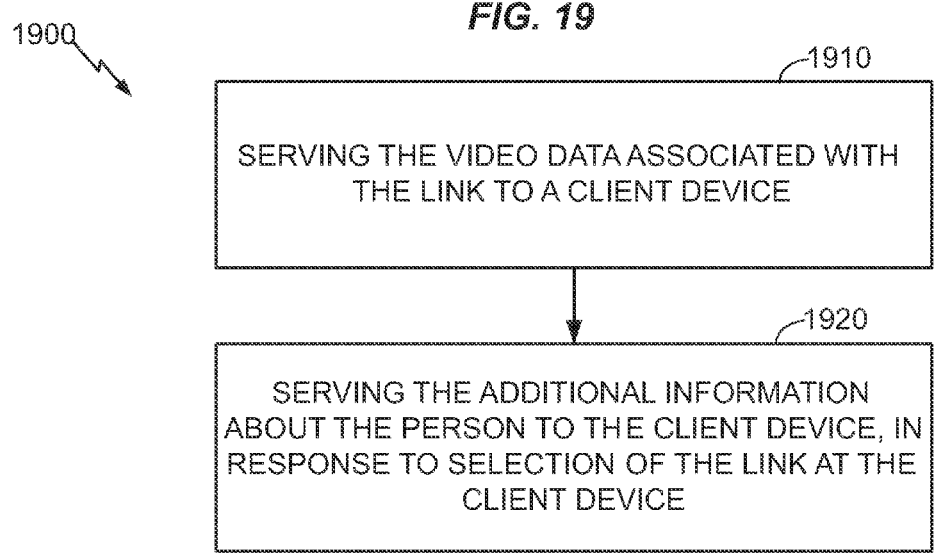

In other aspects, with reference to FIG. 19, the method may include additional operations 1900 for serving data to a client device prior to, or in response to, detecting selection of the link associated with a face track. The method 1700 may further include, at 1910, serving the video data associated with the link to a client device, prior to detecting selection of the link. The video data may be downloaded, streamed from a video streaming system as illustrated in FIG. 1, distributed on a tangible medium, or provided in some other manner. The method 1700 may further include, at 1920, serving the additional information about the person to the client device, in response to selection of the link at the client device. For example, in response to detecting selection of a link, a client device may generate and transmit an HTTP "get" request to an address associated by the link, in response to which the server that receives the "get" request may provide the additional information.

In other aspects, with reference to FIG. 20, the method 1700 may include additional operations 2000 for playing the video data or for configuring the link associated with the face track. The method 1700 may further include, at 2010, playing the video data on a client device, using a media player component enabling selective activation of the link. Specific examples of suitable media player components and client devices are provided herein above. The method 1700 may further include, at 2020, configuring the link as an overlain object following, while the video data is played by a video player component, along the track of the face. The method 1700 may further include, at 2030, configuring the overlain object comprising a visible indication of a region around the face, for example, a box outline. The method 1700 may further include, at 2040, configuring the link to indicate selection of the link in response to detecting pointing input hovering over the overlain object. The link may be configured in any suitable alternative manner.

In other aspects, with reference to FIG. 21, the method 1700 may include additional operations 2100 for populating a database used in face track tagging. The method 1700 may further include, at 2110, populating a database relating identifiers for video files to at least personal identities and locators for video frames, or face tracks, in which identified persons appear in each of the video files. The method 1700 may further include, at 2120, populating the database in response to identifying the face. For example, once a face track is tagged with an identifier for an actor, information defining the face track may be entered into the database in a record associated with an identifier for the actor.

In other aspects, with reference to FIG. 22, the method 1700 may include additional, more detailed operations 2200 used in face track tagging, such as have been described in detail in the foregoing disclosure. For example, the method 1700 may further include, at 2210, defining the track of the face through multiple frames of the video data by processing the video data with an automatic object-tracking algorithm. Any suitable algorithm, for example as disclosed herein, may be used for defining the track of the face. The method 1700 may further include, at 2220, identifying a shot comprising multiple frames in the video data, by processing the video data with a shot boundary detection algorithm. For example, the video data may be processed using a shot boundary detection algorithm as disclosed herein above. The method 1700 may further include, at 2230, optimizing an appearance difference between face areas in adjacent frames, thereby identifying an optimal face area in each frame. An optical flow algorithm as disclosed above for face tracking, which operates by optimizing an appearance difference between face areas in adjacent frames, may be used. The method 1700 may further include, at 2240, recognizing the face using a facial recognition algorithm to obtain an identifier of the person, and tagging the track of the face with an identifier of the person, for example using any suitable method for face recognition and track annotation as disclosed herein above. The method 1700 may further include, at 2250, selecting the identifier of the person from a set of personal identities credited as actors in metadata of the video data. For example film or episode credits may be scanned to identify a set of actors to whom any face appearing in the program is more likely to belong to. The method 1700 may include any other more detailed operation described in the present specification.

With reference to FIG. 23, there is provided an exemplary apparatus 2300 that may be configured as computer server, or the like, for providing interactive video content including information linked to face tracks. The apparatus 2300 may include functional blocks that can represent functions implemented by a processor, software, or combination thereof (e.g., firmware).

As illustrated, in one embodiment, the apparatus 2300 may include an electrical component or means 2302 for detecting a face (e.g., a facial image) appearing in a frame of digital video data by processing the video file with a facial detection algorithm. For example, the electrical component or means 2302 may include at least one control processor 2310 coupled to a memory component 2316. The control processor may operate an algorithm, which may be held as program instructions in the memory component. The algorithm may include, for example, one or more of the algorithms for facial detection as disclosed in the detailed disclosure above, for example, using an LBP histogram for feature comparison combined with RankBoost.

The apparatus 2300 may further include an electrical component or module 2304 for configuring at least one user-selectable link to be activated along a track of the face through multiple frames of the video data, wherein the user-selectable link comprises a data address for obtaining additional information about a person identified with the face. For example, the electrical component or means 2304 may include at least one control processor 2310 coupled to a memory component 2316. The control processor may operate an algorithm, which may be held as program instructions in the memory component. The algorithm may include, for example, receiving information defining a face track from a tracking algorithm as disclosed herein, generating a link using a tag from a face track tagging process, generating an interactive object configured with an address or other identifier based on the tag, and locating the link in a video layer based on the face track.

The apparatus 2300 may further include an electrical component or module 2306 for storing the video data associated with the user-selectable link in a computer memory. For example, the electrical component or means 2306 may include at least one control processor 2310 coupled to a memory component 2316. The control processor may operate an algorithm, which may be held as program instructions in the memory component. The algorithm may include, for example, providing the configured video data to a video storage component from which it can be streamed on demand to multiple client devices.

The apparatus 2300 may include similar electrical components for performing any or all of the additional operations 1800, 1900, 2000, 2100, or 2200 described in connection with FIGS. 18-22, which for illustrative simplicity are not shown in FIG. 23.

In related aspects, the apparatus 2300 may optionally include a processor component 2310 having at least one processor, in the case of the apparatus 2300 configured as a video processing apparatus, alone or in combination with a client device. The processor 2310, in such case may be in operative communication with the components 2302-2306 or similar components via a bus 2312 or similar communication coupling. The processor 2310 may effect initiation and scheduling of the processes or functions performed by electrical components 2302-2306.

In further related aspects, the apparatus 2300 may include a network interface component 2314 enabling communication between a client and a server. The apparatus 2300 may optionally include a component for storing information, such as, for example, a memory device/component 2316. The computer readable medium or the memory component 2316 may be operatively coupled to the other components of the apparatus 2300 via the bus 2312 or the like. The memory component 2316 may be adapted to store computer readable instructions and data for implementing the processes and behavior of the components 2302-2306, and subcomponents thereof, or the processor 2310, or the methods disclosed herein. The memory component 2316 may retain instructions for executing functions associated with the components 2302-2306. While shown as being external to the memory 2316, it is to be understood that the components 2302-2306 can exist within the memory 2316.

It should be understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term "non-transitory computer-readable medium" as used herein may refer to any medium that participates in holding instructions for execution by a processor or that stores data for processing by a computer. Such a medium may take many forms, including but not limited to, non-volatile media, volatile media, and temporary storage media (e.g., cache memory). Non-volatile media may include optical or magnetic disks, such as a storage device. Volatile media may include dynamic memory, e.g., RAM. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for providing interactive video content including a plurality of frames, the method comprising:
    executing an automatic face detection algorithm on video data of a first subset of the plurality of frames to detect a face in the video content;
    executing a face tracking algorithm to define a track of the face through multiple frames of the video content by analyzing video characteristics of the video content, wherein the track includes a first set of faces detected by the automatic face detection algorithm in the first subset of frames and a second set of faces not detected by the automatic face detection algorithm in a second subset of frames;
    selecting a sample face from the first set of faces and the second set of faces in a frame of the video data to represent the track of the face;
    executing an automatic face recognition algorithm on the sample face to identify the sample face belongs to a specific person;
    configuring at least one user-selectable link to be activated for the first set of faces and the second set of faces along the track of the face through multiple frames of the video data based on the identifying of a person for the sample face, wherein the user-selectable link comprises a data address for obtaining additional information about the person identified with the face; and
    storing the video data associated with the user-selectable link in a computer memory.

2. The method of claim 1, further comprising storing the additional information about the person in a memory location addressed by the data address.

3. The method of claim 1, further comprising configuring the additional information to comprise biographical information about the person.

4. The method of claim 1, further comprising serving the video data associated with the link to a client device.

5. The method of claim 4, further comprising serving the additional information about the person to the client device, in response to selection of the link at the client device.

6. The method of claim 1, further comprising playing the video data on a client device using a media player component enabling selective activation of the link.

7. The method of claim 1, further comprising configuring the link as an overlain object following along the track of the face while the video data is played by a video player component.

8. The method of claim 7, further comprising configuring the overlain object to comprise a visible indication of a region around the face.

9. The method of claim 4, further comprising configuring the link to indicate selection of the link in response to detecting pointing input hovering over the overlain object.

10. The method of claim 1, wherein the computer memory holds the video data associated with the user-selectable link together in one or more stored files.

11. The method of claim 1, wherein the data address indicates a record holding the additional information.

12. The method of claim 1, further comprising populating a database relating identifiers for video files to at least personal identities and locators for video frames in which identified persons appear in each of the video files.

13. The method of claim 1, further comprising identifying a shot comprising multiple frames in the video data, by processing the video data with a shot boundary detection algorithm, wherein the track of the face is limited to being within the shot.

14. The method of claim 1, wherein the automatic face tracking algorithm includes optical flow optimizing an appearance difference between face areas in adjacent frames, thereby identifying an optimal face area in each frame.

15. The method of claim 1, further comprising using the automatic face recognition algorithm to obtain an identifier of the person, and tagging the track of the face with the identifier of the person.

16. The method of claim 15, further comprising selecting the identifier of the person from a set of personal identities credited as actors in metadata of the video data.

17. An apparatus for providing interactive video content including a plurality of frames, comprising:
at least one computer processor configured for:
executing an automatic face detection algorithm on video data of a first subset of the plurality of frames to detect a face in the video content;
executing a face tracking algorithm to define a track of the face through multiple frames of the video content by analyzing video characteristics of the video content, wherein the track includes a first set of faces detected by the automatic face detection algorithm in the first subset of frames and a second set of faces not detected by the automatic face detection algorithm in a second subset of frames;
selecting a sample face from the first set of faces and the second set of faces in a frame of the video data to represent the track of the face;
executing an automatic face recognition algorithm on the sample face to identify the sample face belongs to a specific person;
configuring at least one user-selectable link to be activated for the first set of faces and the second set of faces along the track of the face through multiple frames of the video data based on the identifying of a person for the sample face, wherein the user-selectable link comprises a data address for obtaining additional information about the person identified with the face; and
storing the video data associated with the user-selectable link in a computer memory, wherein the computer memory is coupled to the at least one computer processor for storing data.

18. The apparatus of claim 17, wherein the computer processor is further configured for storing the additional information about the person in a memory location addressed by the data address.

19. The apparatus of claim 17, wherein the computer processor is further configured for configuring the additional information to comprise biographical information about the person.

20. The apparatus of claim 17, wherein the computer processor is further configured for serving the video data associated with the link to a client device.

21. The apparatus of claim 20, wherein the computer processor is further configured for serving the additional information about the person to the client device, in response to selection of the link at the client device.

22. The apparatus of claim 17, wherein the computer processor is further configured for playing the video data on a client device using a media player component enabling selective activation of the link.

23. The apparatus of claim 17, wherein the computer processor is further configured for configuring the link as an overlain object following along the track of the face while the video data is played by a video player component.

24. The apparatus of claim 23, wherein the computer processor is further configured for configuring the overlain object comprising a visible indication of a region around the face.

25. The apparatus of claim 17, wherein the computer processor is further configured for configuring the link to indicate selection of the link in response to detecting pointing input hovering over the overlain object.

26. The apparatus of claim 17, wherein the computer memory holds the video data associated with the user-selectable link together in one or more stored files.

27. The apparatus of claim 17, wherein the data address indicates a record holding the additional information.

28. The apparatus of claim 17, wherein the computer processor is further configured for populating a database relating identifiers for video files to at least personal identities and locators for video frames in which identified persons appear in each of the video files.

29. The apparatus of claim 17, wherein the computer processor is further configured for identifying a shot comprising multiple frames in the video data, by processing the video data with a shot boundary detection algorithm, wherein the track of the face is limited to being within the shot.

30. The apparatus of claim 17, wherein the computer processor is further configured for executing the automatic face tracking algorithm including optical flow optimizing an appearance difference between face areas in adjacent frames, thereby identifying an optimal face area in each frame.

31. The apparatus of claim 17, wherein the computer processor is further configured for using the automatic face recognition algorithm to obtain an identifier of the person, and tagging the track of the face with the identifier of the person.

32. The apparatus of claim 31, wherein the computer processor is further configured for selecting the identifier of the person from a set of personal identities credited as actors in metadata of the video data.

33. A non-transitory computer-readable medium holding coded instructions, that when executed by a processor, causes a computer to perform the operations of:
executing an automatic face detection algorithm on video data of a first subset of the plurality of frames to detect a face in the video content;
executing a face tracking algorithm to define a track of the face through multiple frames of the video content by analyzing video characteristics of the video content, wherein the track includes a first set of faces detected by the automatic face detection algorithm in the first subset of frames and a second set of faces not detected by the automatic face detection algorithm in a second subset of frames;

selecting a sample face from the first set of faces and the second set of faces in a frame of the video data to represent the track of the face;

executing an automatic face recognition algorithm on the sample face to identify the sample face belongs to a specific person;

configuring at least one user-selectable link to be activated for the first set of faces and the second set of faces along the track of the face through multiple frames of the video data based on the identifying of a person for the sample face, wherein the user-selectable link comprises a data address for obtaining additional information about the person identified with the face; and storing the video data associated with the user-selectable link in a computer memory.

* * * * *